United States Patent Office 3,567,667
Patented Mar. 2, 1971

3,567,667
MOULD LININGS COMPOSITION COMPRISING BALL MILL DUST AND CALCIUM SILICATE, ALUMINUM SILICATE OR CALCIUM ALUMINO SILICATE FIBROUS REFRACTORY MATERIAL
Bernard Carl Rumbold, Nechells, England, assignor to Foseco International Limited, Birmingham, England
No Drawing. Filed Feb. 23, 1968, Ser. No. 707,471
Claims priority, application, Great Britain, Mar. 22, 1967, 13,587/67
Int. Cl. B22c 1/22; C08g 51/18
U.S. Cl. 260—17.2      7 Claims

ABSTRACT OF THE DISCLOSURE

Hot topping and mould lining materials which contain a major proportion of ball mill dust and proportions of refractory fibrous materials selected from calcium silicate, aluminium silicate and calcium aluminosilicate having advantageous properties compared with prior art similar materials containing asbestos.

---

The present invention relates to slabs, sleeves and the like used for lining foundry moulds or the heads of ingot moulds or head boxes for such moulds, and is an improvement of the invention described and claimed in Patent No. 3,326,273.

In Patent No. 3,326,273 there is described a composition suitable for lining the inner surface of a casting mould for casing metal or of a hot top for such a mould which comprises at least 50% by weight ball mill dust and is free from oxidising agents. The composition may also contain 2 to 30% by weight of organic fibrous material, 1 to 10% by weight of a binding medium and 1 to 10% by weight of a fibrous refractory material. Thus a suitable composition comprises 78–94% by weight of ball mill dust, 3 to 9% by weight of organic fibrous material and 1–8% of a binding agent.

This composition may contain a proportion of asbestos. In use, hot tops made of such a composition tend to disintegrate under the action of the heat of the cast molten metal. The spent composition will generally fall away as a loose powder from the solidified casting or ingot during the stripping operation. Workmen involved in these operations may therefore be exposed to the risk of asbestosis by inhalation of the dust-laden atmosphere. I have now found that by the incorporation of fibrous refractory materials other than asbestos, such as spun mineral fibre e.g. calcium silicate and alumino silicate fibres, and slag wool, complete disintegration during use may be avoided and the properties of products made from the compositions may be improved.

According to the present invention therefore there is provided a composition suitable for lining the inner surface of a casting mould for casting metal or of a hot top for such a mould which comprises ball mill dust, fibrous organic material, fibrous refractory material selected from calcium silicate, aluminium silicate and calcium alumino silicate fibre, and a binder therefore, the proportion of ball mill dust being at least 50% by weight of the composition. Such compositions may contain some asbestos as well as the other fibrous refractory material, principally for reasons of economy, but the proportion of asbestos must be less than half the total fibrous refractory material present. Preferably the proportion of asbestos is not greater than 10% of the total composition.

Products made from compositions according to the present invention generally display increased permeability, green strength and resistance to mechanical shock as compared with earlier ball mill dust containing products. In addition, they are generally of decreased density, thermal conductivity and brittleness, and their formation by slurry dewatering techniques is easier than with asbestos-containing materials.

Many types of calcium silicate, aluminium silicate and calcium aluminosilicate fibres may be used. The preferred material, for reasons of economy, is slag wool. The material known as Eldorite may be used with satisfactory results. Analysis of Eldorite and of a slag wool are given below.

ELDORITE

| Chemical analysis (by weight): | Percent |
|---|---|
| $SiO_2$ | 33.84 |
| $Fe_2O_3$ | 0.85 |
| Al | 16.35 |
| CaO | 42.06 |
| MgO | 6.53 |
| $SO_3$ | 0.10 |
| S | 0.24 |

Eldorite sinters at 750° C.–800° C. and melts at 1,300° C.

SLAG WOOL

| Chemical analysis (by weight) | Percent |
|---|---|
| $Fe_2O_3$ | 1.2 |
| MgO | 7.8 |
| $SiO_2$ | 33.8 |
| MnO | 1.0 |
| $Al_2O_3$ | 12.5 |
| CaO | 34.7 |
| $TiO_2$ | 0.8 |

The melting point of this material is 1,260° C. its continuous operating temperature being 800–900° C. Fibre length is generally 6–20 mm.

The ball mill dust used may vary widely in properties. In making former materials of this type difficulties have been found in controlling the permeability of the final product, since this depends greatly on the particular type of ball mill dust employed. Using the compositions of the present invention, products of more controllable permeability may be prepared, if necessary using lower grade Ball Mill dust, i.e. ball mill dust with a high proportion of powdery material therein. In addition, the permeability, as noted above, generally tends to be higher using the compositions of the present invention, thus decreasing the tendency toward boiling of the molten metal during casting. Both washed and unwashed ball mill dust may be used.

The compositions of the present invention may also contain up to 10% by weight particulate refractory fillers, for example silica flour, sand, crushed olivine, chamotte or grog, and fibrous organic materials, preferably cellulosic, such as paper pulp, wood pulp or wood flour.

The binders used may be any known per se for the purpose, e.g. phenolformaldehyde or ureaformaldehyde resin, furane resins, or any of the binders disclosed in Patent No. 3,326,273.

The quantities used will generally be in the following ranges by weight:

| | Percent |
|---|---|
| Ball mill dust | 50–85 |
| Fibrous refractory material (other than asbestos) | 1 to 20 |
| Fibrous organic material | Up to 10 |
| Binder | 1 to 5 |

In general, the higher the proportion of fibrous refractory material other than asbestos used, the lower will be the proportion of fibrous organic material used, and in some compositions the proportion of organic fibrous material may be extremely low. However, compositions for use in high temperature casting, for example in casting steel at 1600° C., will generally contain lower proportions of fibrous refractory materials since otherwise they tend not to be sufficiently refractory. This difficulty may be partially avoided by using a high proportion of aluminosilicate fibres, but their cost generally makes such use uneconomic. Calcium silicate fibres are generally preferred for reasons of economy.

The fibre length chosen is preferably a few mm., though longer or shorter fibred materials may be used.

It is possible to produce heat insulating materials containing other refractory fibrous materials than those noted above, but the cost of such materials is prohibitive.

If the proportion of organic fibrous material is too high, the products tend to have an undesirably low permeability.

It is generally desirable to include in the composition 1–7% by weight of a fluoride, generally fluorspar, to act as an initiator for the burning of the products.

The products of the present invention have the property of sintering during the casting operation. This has the advantage that when the burnt out product is removed from the cast metal, it falls away in coherent pieces and not as dust, thus minimising the asbestosis risk, even with materials containing a substantial proportion of asbestos.

The present invention includes not only the compositions used for making slabs and sleeves and the like, but shaped articles such as slabs and sleeves so made.

The present invention will be further illustrated in the following specific examples. In these examples, Example 1 describes the production and use of a composition according to Patent No. 3,326,273 and Example 2 describes the production and use of a composition according to the present invention.

Example 1

Various compositions were made up using various types of ball mill dust and the following proportions by weight of the ingredients listed.

| | Percent |
|---|---|
| Ball mill dust (unwashed) | 85 |
| Mixed phenolformaldehyde/ureaformaldehyde resin | 4 |
| Mixed phenolformaldehyde/ureaformaldehyde resin | 4 |
| Asbestos | 1.5 |
| Paper pulp | 6.5 |
| Fluorspar (initiator) | 3 |

These ingredients were made up into a 15–25% solids aqueous slurry, and test sleeves of height 6", internal diameter 6" and external diameter 7" were formed by dewatering quantities of said slurry at a pressure of 28–30 p.s.i. for about 15 seconds. The resulting green products were then stoved to drive off remaining water. Tests on the product sleeves showed densities of from 0.9 to 0.95 gm./cc., and permeabilities from 3.8 to 14.8 AFS units, depending on the type and grade of ball mill dust used. The product sleeves required fairly careful handling. The sleeves were stood on a refractory base and filled with fully killed steel at 1650° C. The products burnt out with only a little gassing and did not sinter. The burnt-out sleeves fell to dust when stripped from the solidified steel cylinders, and the cylinders had only a fair surface finish.

Example 2

Various compositions were prepared using various types of ball mill dust and the following proportions by weight of the ingredients listed:

| | Percent |
|---|---|
| Ball mill dust (unwashed) | 75 |
| Mixed phenolformaldehyde/ureaformaldehyde resin | 4 |
| Asbestos | 1.5 |
| Paper pulp | 6.5 |
| Spun mineral fibre | 10 |
| Fluorspar (initiator) | 3 |

These ingredients were made up into a 15–20% solids aqueous slurry, and slabs formed by dewatering quantities of said slurry at a pressure of 20–22 p.s.i. for about 20 seconds. The resulting green products, which were of greater strength than those of Example 1, were then stoved to drive off the remaining water. Tests on the product slabs showed densities of about 0.7 gm./cc., and permeabilities from 17 to 19 AFS units, depending on the type and grade of ball mill dust used. The product slabs were easy to handle and did not show as high a tendency to breakage when dropped from a height of one metre as those of Example 1.

The slabs were used to line the heads of ingot moulds into which fully killed steel was poured at 1600° C. The products burnt out smoothly and no gassing was observed, as sintered. The steel surface had a smooth surface finish.

I claim as my invention:

1. A composition suitable for lining the inner surface of a casting mould for casting metal, or a hot top for such a mould, consisting essentially of 50–85 weight percent ball mill dust, up to 10 weight percent of a fibrous organic material selected from the group consisting of paper pulp, wood pulp, and wood flour, 1–20 weight percent of a fibrous refractory material selected from the group consisting of calcium silicate, aluminium silicate and calcium aluminosilicate, and 1–5 weight percent of a binder.

2. Slabs, sleeves and the like for lining foundry moulds and the heads of ingot moulds and head boxes for such moulds consisting essentially of 50–85 weight percent ball mill dust, up to 10 weight percent of a fibrous organic material selected from the group consisting of paper pulp, wood pulp, and wood flour, 1–20 weight percent of a fibrous refractory material selected from the group consisting of calcium silicate, aluminium silicate, and calcium aluminosilicate and 1–5 weight percent of a binder.

3. A composition according to claim 1 which contains up to 10% by weight of asbestos.

4. A composition according to claim 1 which contains up to 10% by weight of particulate refractory filler selected from the group consisting of sand, silica flour, crushed olivine, chamotte and grog.

5. A composition according to claim 1 wherein the binder is selected from the class consisting of urea-formaldehyde and phenolformaldehyde resins.

6. A composititon according to claim 1 which comprises 1–7% by weight of a fluoride.

7. A composition according to claim 6 wherein the fluoride is fluorspar.

References Cited

UNITED STATES PATENTS 3,300,322   1/1967   DeGeer _____ 106—38.35

OTHER REFERENCES

Chem. Abst., vol. 67: 67196v, Jago et al., "Exothermic Hot Top," June 1967 (December 1965).

Chem. Abst.: 2138f, Bunbury, "Bonding—Molds," 1959.

Chem. Abst., vol. 66: 13344c, Rietz et al., "Synthetic Slag for Casting Steel," August 1966.

Chem. Abst., vol. 64: 17144q, Doittau, "Exothermic Composition," April 1965.

WILLIAM H. SHORT, Primary Examiner

E. WOODBERRY, Assistant Examiner

U.S. Cl. X.R.

164—43; 260—17.3